US009215707B1

(12) United States Patent
Malreddy et al.

(10) Patent No.: US 9,215,707 B1
(45) Date of Patent: Dec. 15, 2015

(54) METHOD AND SYSTEM FOR PRIORITIZING TIME-DIVISION MULTIPLEXED COMMUNICATIONS RESOURCES AT A FEMTOCELL

(75) Inventors: Muralidhar Malreddy, Overland Park, KS (US); Ryan S. Talley, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 577 days.

(21) Appl. No.: 12/886,232

(22) Filed: Sep. 20, 2010

(51) Int. Cl.
*H04W 72/04* (2009.01)
*H04W 72/10* (2009.01)

(52) U.S. Cl.
CPC .......... *H04W 72/0446* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 5,016,247 A * | 5/1991 | Cidon et al. | .................. | 370/370 |
| 5,513,183 A * | 4/1996 | Kay et al. | ....................... | 370/337 |
| 5,923,849 A * | 7/1999 | Venkatraman | ................ | 370/355 |
| 6,975,876 B1 * | 12/2005 | Cast | ...................... | H04L 12/585 370/237 |
| 7,072,661 B2 | 7/2006 | Vitebsky | | |
| 7,366,155 B1 * | 4/2008 | Leppisaari et al. | ........... | 370/348 |
| 7,408,901 B1 * | 8/2008 | Narayanabhatla | ............ | 370/331 |
| 7,457,641 B1 | 11/2008 | Legnain et al. | | |
| 8,320,355 B1 * | 11/2012 | Ho | ................................ | 370/345 |
| 2003/0179756 A1 * | 9/2003 | Cain | ............................. | 370/332 |
| 2004/0137907 A1 * | 7/2004 | Kim | ............................. | 455/450 |
| 2005/0249173 A1 * | 11/2005 | Salokannel et al. | .......... | 370/338 |
| 2007/0127527 A1 * | 6/2007 | Dan et al. | ....................... | 370/477 |
| 2007/0249381 A1 * | 10/2007 | Forslow | .............. | H04W 72/005 455/517 |
| 2008/0058004 A1 * | 3/2008 | Gonorovsky et al. | ....... | 455/552.1 |
| 2009/0170528 A1 * | 7/2009 | Bull et al. | ................... | 455/456.2 |
| 2009/0288140 A1 * | 11/2009 | Huber et al. | ................... | 370/338 |
| 2009/0310540 A1 * | 12/2009 | Barany et al. | ................. | 370/328 |
| 2009/0310560 A1 * | 12/2009 | Gandham et al. | ............. | 370/331 |
| 2010/0220693 A1 * | 9/2010 | Ho | ................................ | 370/336 |
| 2010/0272065 A1 * | 10/2010 | Lee et al. | ....................... | 370/331 |
| 2011/0149888 A1 * | 6/2011 | Liu et al. | ........................ | 370/329 |
| 2011/0176478 A1 * | 7/2011 | Inohiza | .......................... | 370/315 |

OTHER PUBLICATIONS

Svedman et al., "A QoS-aware Proportional Fair Scheduler for Opportunistic OFDM," Jul. 5, 2004, 2006 IEEEE.

* cited by examiner

*Primary Examiner* — Chirag Shah
*Assistant Examiner* — Joshua Smith

(57) ABSTRACT

Methods and systems are provided for prioritizing time-division multiplexed communications resources at a femtocell. A femtocell initially provides time-division-multiplexed wireless service to a plurality of wireless communication devices (WCDs) using a first number of slots per cycle, each WCD in the plurality having at least one assigned slot. During the first time period, the femtocell detects a trigger. Responsive to detecting the trigger, the femtocell, in a second time period, switches to providing service using a second number of slots per cycle, the second number being less than the first number, such that a first WCD in the plurality does not have an assigned slot.

15 Claims, 5 Drawing Sheets

METHOD AND SYSTEM FOR PRIORITIZING TIME-DIVISION MULTIPLEXED COMMUNICATIONS RESOURCES AT A FEMTOCELL

BACKGROUND

1. Cellular Wireless Networks

Many people use wireless communication devices (WCDs), such as cell phones, computers, laptop computers, and personal digital assistants (PDAs), to communicate with cellular wireless networks. Service providers that operate these wireless networks typically distribute WCDs to their subscribers, perhaps by selling the WCDs at retail outlets or over the Internet, or perhaps by offering WCDs at no cost to people that subscribe to a particular service plan.

Service providers then typically assign each WCD a telephone directory number—often known as a mobile identification number (MIN) or mobile directory number (MDN)—under which a WCD may operate. Via a manual or over-the-air provisioning process, the service provider will cause the WCD to store its MIN in its Number Assignment Module (NAM). Furthermore, a WCD is typically provided at the time of manufacture with an electronic serial number (ESN), which identifies the WCD as a unique physical device.

These WCDs and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a WCD is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

WCDs and macro base stations conduct communication sessions (e.g., voice calls and data sessions) over frequencies known as carriers, each of which may actually be a pair of frequencies, with the base station transmitting to the WCD on one of the frequencies, and the WCD transmitting to the base station on the other. This approach is known as frequency division duplex (FDD). The base-station-to-WCD link is known as the forward link, while the WCD-to-base-station link is known as the reverse link.

Either or both of the forward link and the reverse link may be further divided based on Time Division Multiplexing (TDM) in which a plurality of time-divided channels are provided on the link, or based on Code Division Multiplexing (CDM) in which a plurality of code-divided channels are provided on the link. The use of TDM to provide services between an infrastructure node (e.g., base station) and a plurality of client nodes (e.g., WCDs) is generally referred to herein as TDMA. The use of CDM to provide services between an infrastructure node and a plurality of client nodes is generally referred to herein as CDMA.

WCDs are programmed to use a pre-determined algorithm to select one of the carriers to use in communications with a base station. When a WCD is not engaged in an active communication session, the WCD does what is known as idling on the selected carrier, which means among other things that the WCD is tuned to that carrier for receiving page messages, SMS messages, and other similar messages, and that the WCD will also send access requests for call origination and other purposes to the base station on that carrier.

2. Femtocells

Many macro-network subscribers, including private consumers and businesses, among others, in addition to having wireless service (which may include data service) for their WCD (or WCDs), also have high-speed (a.k.a. "broadband") Internet access through another communication channel. This other channel may be cable-modem service, digital-subscriber-line (DSL) service, satellite-based Internet service, T1 service, and/or some other option.

In an example arrangement, a user may have a cable modem connected (a) via coaxial cable to a cable provider's network and (b) via Ethernet cable to a local wireless network (e.g., IEEE 802.11 Wi-Fi-enabled router). The router may include one or more Ethernet ports to which additional computers or other devices may also be connected, and may include wireless-access-point functionality, providing a Wi-Fi packet-data interface to, for example, laptop computers, digital video recorders (DVRs), appliances, and/or any other computing devices or wireless network adapters.

To address gaps in macro-network coverage (e.g., in buildings and homes) and for other reasons, macro-network service providers have recently begun offering their clients devices referred to herein as femtocells.

A typical femtocell may be approximately the size of a desktop phone or Wi-Fi access point, and is functionally a low-power, low-capacity version of a macro base station. Thus, a typical femtocell will use a normal power outlet, perhaps with a transformer providing a DC power supply. The femtocell may have a wired (e.g., Ethernet) or wireless (e.g., Wi-Fi) connection with the user's router and/or cable modem, and would thus have connectivity to the Internet and/or one or more other packet-data networks via the user's broadband connection. The femtocell may then also have access to the devices connected to the user's router through the router's Ethernet and/or Wi-Fi interfaces.

A femtocell may establish a virtual-private-network (VPN) connection over the Internet with an entity (e.g., a VPN terminator) on the wireless-service (macro-network) provider's core network, and thereby be able to securely communicate with the VPN terminator and other entities on that core network and beyond. The femtocell may thus provide additional functionality to WCDs that it serves via access to the core network.

The femtocell also has a wireless-communication (e.g., CDMA, TDMA) interface that is compatible with the user's WCD(s), such that the femtocell may act as a micro base station, providing local wireless coverage on the wireless-service provider's network via the user's Internet connection. Usually, a femtocell will provide service on a single RF carrier (or on a single carrier per technology, where multiple technologies (such as CDMA and TDMA) are supported), and also transmit what is known as a pilot beacon, which includes administrative messages and parameters that WCDs can use to connect with the femtocell.

In particular, the pilot beacon identifies one or more of the carriers and/or channels at the femtocell that the femtocell is providing service on, and on which a pilot may be found. The femtocell's pilot may serve as a demodulation reference and handoff-level-measurement signal, among other purposes. While in some protocols, such as CDMA, the pilot is provided on a separate CDMA channel, other protocols, such as EV-DO (which, among other aspects of the protocol, utilizes TDMA concepts on the forward link), interlace the pilot in time slots among those used to transmit user traffic.

Femtocells may also include a location-determination module (e.g., some combination of hardware, firmware, and/or software). As an example, the location-determination module may comprise a Global Positioning System (GPS) receiver for receiving and decoding GPS signals for use in determination of location, as well as for use in synchronizing operations with other femtocells and with the macro network based on timing information embedded in the GPS signals. Other location-determination methods could also be used. In some instances, a femtocell may not have any location-determination module or capability.

OVERVIEW

As explained above, femtocells are typically low-cost devices that by design have a reduced set of resources and capabilities including, e.g., reduced RF power, reduced number of channel elements, and reduced RF-carrier capability as compared to macro-network base stations (BTSs). Additionally, femtocells often provide the one or more WCDs operated by their registered owners with unlimited voice and data usage when operating within the femtocell's limited coverage area.

In most cases, then, both the registered owner of the femtocell and the wireless-network operator have an interest in maximizing services provided to more-preferred users (which may be, for example, authorized users) and minimizing services to less-preferred users (which may be, for example, unauthorized users). Such prioritization may be implemented at a femtocell to, at a minimum, prevent use of resources that would otherwise be allocated to the registered owner (or owners), as well as to prevent the potential degradation of a paying subscriber's user experience, among other reasons.

To address the above-identified issues, and others, the present methods and systems advantageously arrange and program a femtocell to detect a trigger, and responsively reduce a service level provided to a first set of one or more—but less than all—attached WCDs (i.e., WCDs that are currently actively engaged in at least one communication session via the femtocell) in order to improve quality and availability of its communications resources for the remaining attached WCDs.

In one aspect, detecting the trigger may include detecting that the one or more attached WCDs are less-preferred WCDs, which itself may mean that they are "foreign" (in the sense of not being "home") WCDs that have not been authorized to use the femtocell by, e.g., an owner of the femtocell or perhaps an operator of the cellular network with which the femtocell is associated, etc.

In at least one embodiment, the femtocell may make a determination that the one or more attached WCDs in the first set are less-preferred at least in part by referencing a priority-list structure that associates WCD identifiers with preference levels. The priority-list structure may be stored locally at the femtocell or at some remote location (e.g., at the wireless service provider's network).

In another embodiment, the femtocell may make a determination that the one or more attached WCDs in the first set are less-preferred at least in part by referencing at least one of a whitelist and a blacklist of identifiers associated with authorized and unauthorized WCDs, respectively. In at least one embodiment, the femtocell may determine whether the one or more attached WCDs are less-preferred by transmitting a (e.g., SIP) message to the core wireless network and receiving an authorization response from the core network.

Of course, a determination that one or more of the attached WCDs are more-preferred could also or instead be made, with an effective result that the remaining other attached WCDs are inherently classified as relatively less-preferred. While less-preferred and more-preferred are used for ease of description, any type of ranking system could additionally or alternatively be used, including a ranking system having more than two designations, e.g., relative priority levels such as 1-10.

Other types of triggers could be used instead or in addition. For example, a trigger may be based on a time of day, a day of the week, or some other chronological determination. The trigger may be based upon a number of active users being served by the femtocell, or on some characteristic of the active users other than foreign status. The trigger may be based on some capacity metric, such as remaining available capacity (e.g. channel elements), percentage or fractional capacity, etc. Other variations are possible as well.

In response to detecting the trigger, the femtocell may reduce a service level provided to one or more attached WCDs in order to preserve communications resources for remaining attached WCDs.

A reduction in service level generally comprises reducing a number of timeslots per cycle in a femtocell-provided TDMA wireless service so as to prevent at least one WCD from being assigned a slot during a subsequent time period. For example, the femtocell, during a first time period, provides time-division-multiplexed wireless service to a plurality of WCDs using a first number of slots per cycle, wherein each WCD in the plurality has at least one assigned slot. In response to detecting the above-mentioned trigger, the femtocell, for a second time period, reduces the number of slots per cycle from the first number of slots per cycle to a second number of slots per cycle less than the first. As a result, the femtocell may not assign a timeslot to the at least one WCD during the second time period, and instead, may assign all available slots to all of the remaining plurality of WCDs other than the at least one WCD. After the number of slots per cycle has been reduced, the remaining plurality of WCDs are assigned all of the remaining slots, reserving femtocell resources for the remaining plurality at the expense of the at least one WCD. As a result, service to the remaining plurality of WCDs is likely improved.

In an embodiment, the number of slots per cycle may be equal to the number of WCDs in the plurality. For example, if the femtocell is providing TDMA wireless service to four WCDs, the femtocell may be configured to provide four time slots per cycle, and assign one time slot in each cycle to each respective one of the four WCDs. After detecting the trigger, the femtocell may switch to providing TDMA wireless service using three time slots per cycle, and not assign any time slots to the at least one WCD for a second period of time. The second period of time could be measured in the time domain, and may be, for example, between 1 and 600 seconds. The second period of time may alternately be measured as a number of cycles, and may be, for example, between 1 and 100 cycles. Other ways of measuring the second time period could also be used.

In an embodiment, the femtocell may respond to detecting the trigger by, in addition to reducing a number of slots per cycle, modifying a scheduling priority assigned to one or more of the plurality of WCDs. For example, the femtocell may apply scheduling-prioritization logic that is based at least in part on past data-transfer rates respectively associated with each WCD in the plurality to determine relative priorities for each WCD in the plurality. The determined relative priorities may then determine the order in which available slots are assigned. In response to detecting the trigger, the femtocell may decrease the determined relative priority of a first WCD relative to every other WCD in the plurality. Alternatively or additionally, the femtocell may increase the determined relative priority of a second WCD relative to every other WCD in the plurality. The scheduling-prioritization logic may comprise proportional-fairness logic that also takes as input at least one data rate respectively requested by one or more of the WCDs in the plurality. Other scheduling-prioritization methods may also be implemented, including, for example, round-robin.

In another embodiment, the femtocell may detect a second trigger, and subsequently assign a time slot to the first WCD (that was not assigned a time slot in the second period of time) in a third period of time occurring after the second period of time. Because in some embodiments the femtocell does not actively deny the first WCD service during the second period and cause the first WCD to seek service elsewhere (e.g., on the macro network), the femtocell may, during a third period of time, begin again providing the first WCD with time slots.

The femtocell detecting the second trigger may comprise, for example, the femtocell detecting that every WCD in the plurality except for the first WCD is no longer being assigned a time slot. In other words, the first WCD would no longer disadvantage wireless service provided to any of the other WCDs in the plurality by obtaining assigned time slots from the femtocell. Alternatively, the femtocell detecting the second trigger may comprise the femtocell detecting that at least one WCD in the plurality other than the first WCD is no longer being assigned a time slot. In other words, the femtocell may determine that, after the at least one WCD has powered down or otherwise left the service area of the femtocell, the femtocell now has sufficient resources to serve the first WCD without impacting the remaining other WCDs in the plurality.

In accordance with the foregoing embodiments, a femtocell may reduce a TDMA wireless service level provided to one or more of a plurality of attached WCDs in order to preserve communications resources for the remaining attached WCDs in the plurality.

These as well as other aspects, advantages, and alternatives will become apparent to those of ordinary skill in the art by reading the following detailed description, with reference where appropriate to the accompanying drawings. Further, it should be understood that the embodiments described in this overview and elsewhere herein are intended to be examples only and do not to limit the scope of the claims.

BRIEF DESCRIPTION OF THE DRAWINGS

Various example embodiments are described herein with reference to the following drawings, wherein like numerals denote like entities.

DETAILED DESCRIPTION

1. An Example Architecture

Figure 1:
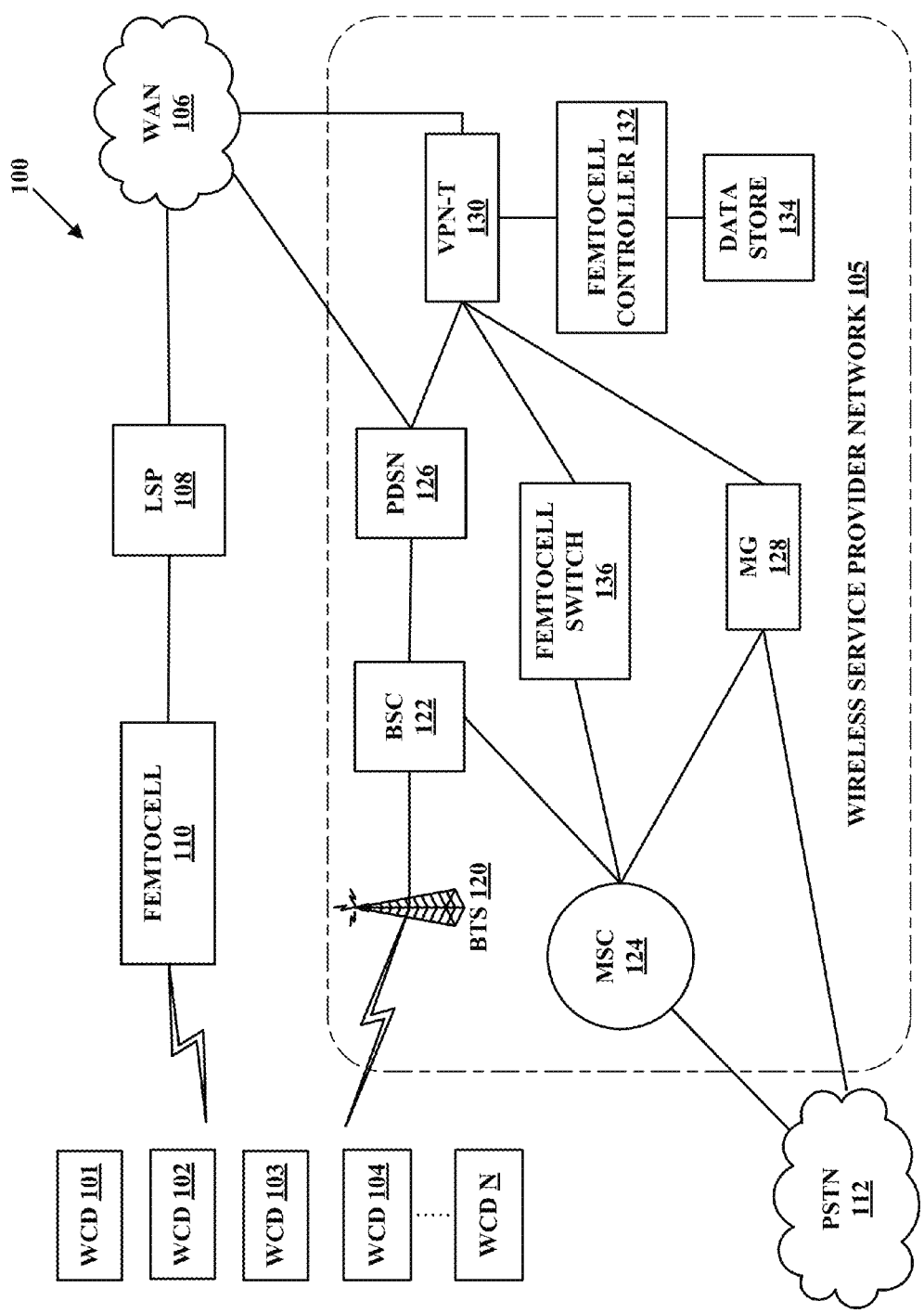
FIG. 1 is a simplified block diagram of a communication system, in accordance with at least one embodiment.

FIG. 1 is a simplified block diagram of a communication system, in accordance with at least one embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes at least first, second, third, and fourth wireless communication devices (WCDs) 101, 102, 103, and 104 and potentially including up to "N" WCDs (where N is, for example, less than or equal to 50), a wireless service provider network (WSPN) 105, a Wide Area Network (WAN) 106, a local service provider (LSP) 108, a femtocell 110, and a public switched telephone network (PSTN) 112.

The WSPN 105 includes a macro base transceiver station (BTS) 120, a base station controller (BSC) 122, a mobile switching center (MSC) 124, a packet data serving node (PDSN) 126, a media gateway (MG) 128, a VPN terminator (VPN-T) 130, a femtocell controller 132, a data store 134, and a femtocell switch 136. Additional entities could be present, such as additional mobile stations in communication with BTS 120 and additional entities in communication with WAN 106 and/or PSTN 112, etc. Also, there could be one or more devices and/or networks making up at least part of one or more communication links.

Figure 2:
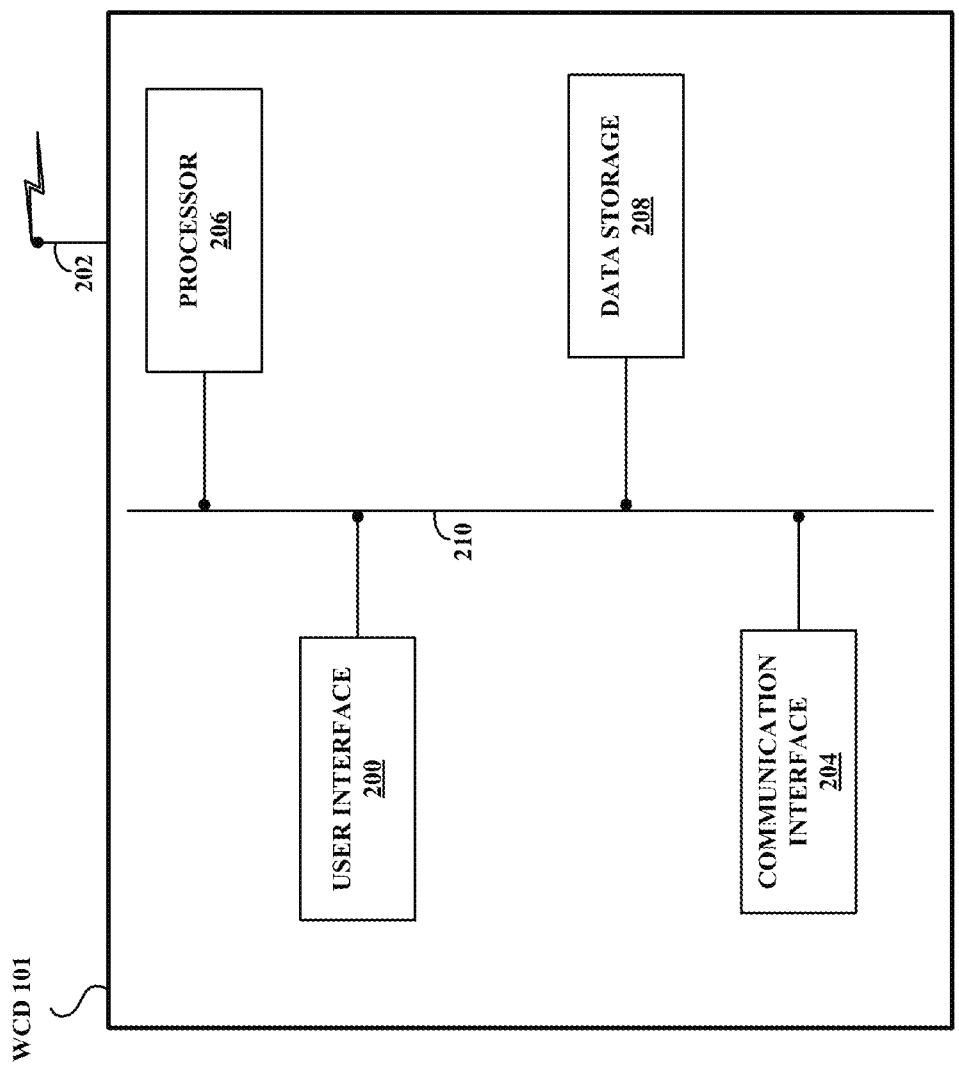
FIG. 2 is a simplified block diagram of a wireless communication device (WCD), in accordance with at least one embodiment.

WCDs 101-104 may each be or include any mobile device arranged to carry out the WCD functions described herein. WCD 101 may be the same or different than WCD 102, WCD 103, and/or WCD 104. While WCD 101 will be used to describe WCD features in general, it should be understood that any of the forthcoming features described relative to WCD 101 may be equally applicable to WCDs 102, 103, and 104. FIG. 2 is a simplified block diagram of a WCD 101, in accordance with an example embodiment. As shown, WCD 101 may include a user interface 200, a wireless-communication interface 202/204, a processor 206, and data storage 208 containing instructions executable by the processor 206 for carrying out WCD functions. The user interface 200 may include buttons, a touch-screen, a microphone, and/or any other elements for receiving inputs, as well as a speaker, one or more displays, and/or any other elements for communicating outputs.

The wireless-communication interface 202/204 of the WCD 101 may include an antenna 202 and a chipset 204 suitable for communicating with one or more macro base stations 108 and/or one or more femtocells 110 over suitable air interfaces. For example, the chipset 204 could be suitable for CDMA and/or TDMA communication. The chipset 204 or wireless-communication interface 202/204 in general may also, or instead, be able to communicate with other types of networks and devices, such as EV-DO networks, Wi-Fi networks, infrared devices, Bluetooth devices, and/or one or more additional types of networks and devices. The processor 206 and data storage 208 may be any suitable components known to those of skill in the art.

Returning to FIG. 1, WSPN 105 may encompass all or some of the network elements depicted in FIG. 1 as being included in its dashed-rectangle shape. In general, there may be more and/or different communication links among entities within WSPN 105 than those set forth in FIG. 1, and there may be more and/or different connections between WSPN 105 and outside entities. Furthermore, there may be a core packet network (not depicted) making up part of WSPN 105, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

WAN 106 may be the well-known global packet-data network generally referred to as the Internet. However, WAN 106 may also be or include one or more other packet-data networks. As such, WAN 106 may include one or more other wide area networks, one or more local area networks, one or more public networks, one or more private networks, one or more wired networks, one or more wireless networks, and/or one or more networks of any other type. Devices in communication with WAN 106 may exchange data using a packet-switched protocol such as the Internet Protocol (IP), and may be identified by an address such as an IP address.

LSP 108 may be any local service provider network that provides local packet-switched communications services to end-user residential and/or business customers and provides the end-user customers with access to the WAN 106. The LSP 108 may provide services to the end-user customers via data over cable service interface specification (DOCSIS), digital subscriber line (DSL), T-carrier, WiMAX, CDMA, or any other now-existing or future access technologies. The LSP 108 may, for example, provide the end-user customer with the necessary electrical medium connection from the premises of the femtocell 110 to the LSP's own network, and may provide the femtocell 110 with one or more IP addresses that may be used to route data across the LSP's network 108 and ultimately to the WAN 106. The LSP's network 108 may comprise one or more switches, routers, dynamic host configuration protocol (DHCP) servers, firewalls, and/or other devices that operate to connect end-user customers to the WAN 106.

Figure 3:
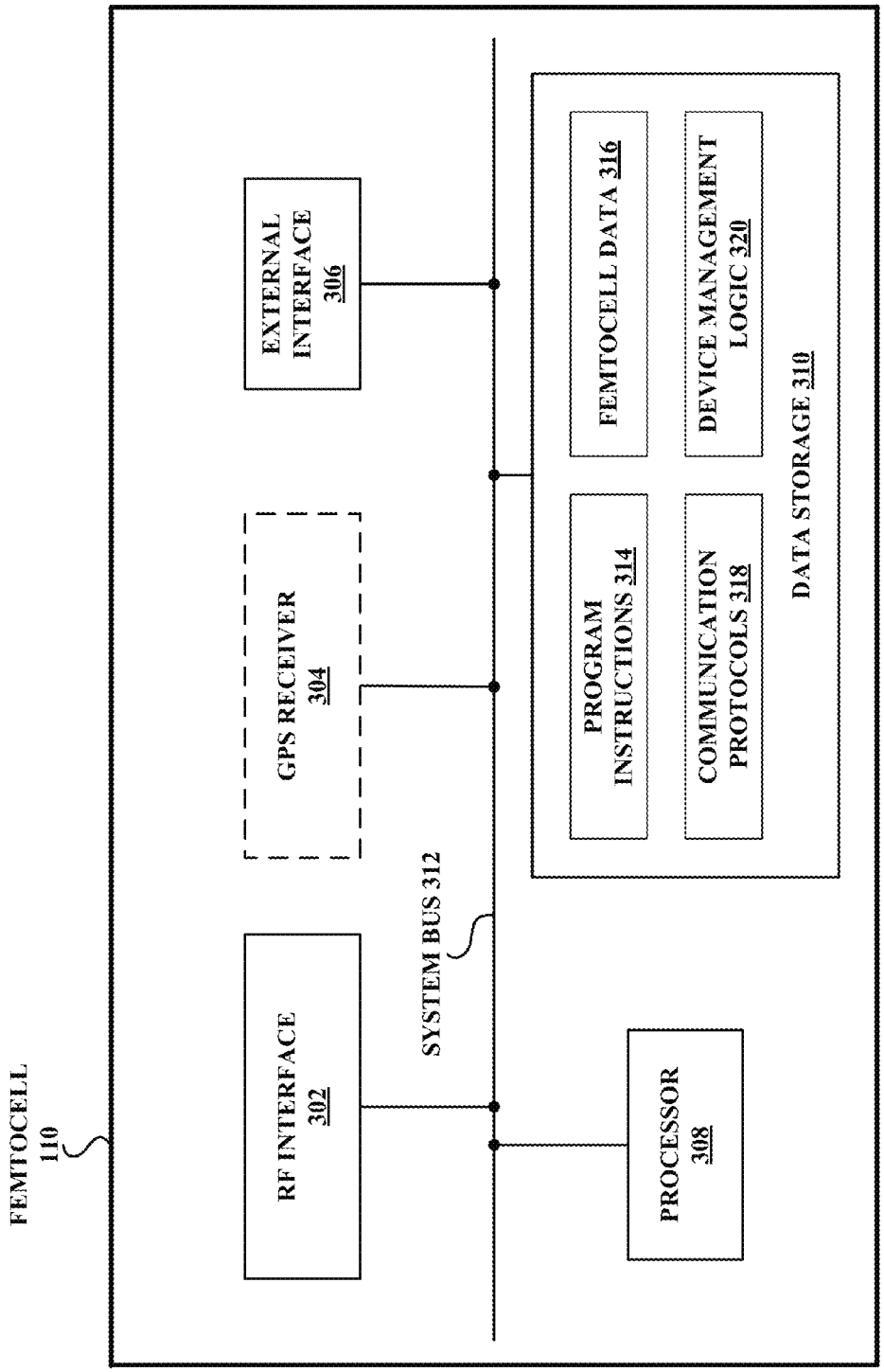
FIG. 3 is a simplified block diagram of a femtocell, in accordance with at least one embodiment.

Femtocell 110 may be any computing and communication device arranged to carry out femtocell functions. As such, femtocell 110 may include a communication interface, a processor, and data storage containing instructions executable by the processor for carrying out the femtocell functions described herein. FIG. 3 is a simplified block diagram of femtocell 110, which includes an RF interface 302, an optional GPS receiver 304, an external interface 306, a processor 308, and data storage 310, all communicatively linked by a system bus 312. Note that femtocell 110 could have additional and/or different components than those set forth in FIG. 3, and that this structure is provided by way of example.

RF interface 302 may include one or more antennas, one or more chipsets, a set of one or more channel elements, and/or one or more other components suitable for providing a wireless coverage area according to a wireless-communication protocol such as CDMA and/or TDMA (and/or one or more other wireless technologies, including, for example EV-DO). GPS receiver 304 may be any known or hereafter-developed GPS receiver, suitable for receiving and decoding GPS signals for location and timing purposes, perhaps among other purposes. In some embodiments, femtocell 110 may have a location module in addition to or instead of GPS receiver 304, or perhaps have no GPS receiver or location module at all.

External interface 306 may provide a wired and/or wireless packet-data interface for communicating with a device such as a switch/router in a local-area network (not pictured) local to the femtocell 110 or with similar devices in the LSP's network 108. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the femtocell functions described herein, (b) femtocell data 316, which may be any operational data or other type of data stored for use by femtocell 110, (c) communication protocols 318, facilitating and enabling communication with one or more other devices, and (d) device management logic 320, perhaps for memory and/or file management.

Returning to FIG. 1, macro BTS 120 may be any network element arranged to carry out macro-BTS functions. As such, macro BTS 120 may include a communication interface, a processor, and data storage containing instructions executable by the processor to carry out the macro-BTS functions. The communication interface may include one or more antennas, chipsets, and/or other components for providing one or more CDMA and/or TDMA (and/or any other protocol(s), including EV-DO) coverage areas such as cells and sectors, for communicating with WCDs such as WCD 101 over an air interface. The communication interface may also include one or more wired (e.g., Ethernet) and/or wireless (e.g., Wi-Fi) interfaces for communicating with at least BSC 122.

BSC 122 may be any network element arranged to carry out BSC functions. As such, BSC 122 may include a communication interface, a processor, and data storage containing instructions executable by the processor to carry out BSC functions. The communication interface may include one or more wired and/or wireless interfaces for communicating with at least macro BTS 120, MSC 124, femtocell switch 136, and PDSN 126. In general, BSC 122 functions to control one or more macro BTSs such as macro BTS 120, and to provide those one or more macro BTSs with connections to devices such as MSC 124, femtocell switch 136, and/or PDSN 126.

Note that the combination of macro BTS 120 and BSC 122 may be considered a macro base station. However, macro BTS 120 or BSC 122 could, taken alone, be considered a macro base station as well. Furthermore, a macro base station may be considered to be either or both of those devices, and perhaps make use of one or more functions provided by MSC 124, PDSN 126, femtocell switch 136, and/or any other entity. And it should be noted that the macro network and/or the femtocell(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 124 may be any networking element arranged to carry out MSC functions. Thus, MSC 124 may include a communication interface, a processor, and data storage containing instructions executable by the processor to carry out MSC functions. The communication interface may include one or more wired and/or wireless interfaces for communicating with at least BSC 122, femtocell switch 136, and PSTN 112. In general, MSC 124 acts as a switch between (a) PSTN 112 and one or more BSCs such as BSC 122 and/or (b) between PSTN 112 and one or more femtocells 110 via femtocell switch 136, facilitating communication between WCDs 101-104 and PSTN 112.

PDSN 126 may be any networking element arranged to carry out PDSN functions. As such, PDSN 126 may include a communication interface, a processor, and data storage containing instructions executable by the processor for carrying out PDSN functions. The communication interface may include one or more wired and/or wireless interfaces for communicating with at least BSC 122, WAN 106, and VPN terminator 130. In general, PDSN 126 acts as a network access server between WAN 106 and BSCs such as BSC 122, facilitating packet-data communication between WCDs 101-104 and WAN 106 via macro base stations 120.

MG 128 may be any networking element arranged to carry out media-gateway functions. As such, MG 128 may include a communication interface, a processor, and data storage containing instructions executable by the processor for carrying out media-gateway functions. The communication interface may include a circuit-switched interface and a packet-switched interface. MG 128 may (a) receive packet-based communications from within the WSPN 105, convert those to circuit-switched communications, and pass them to PSTN 112 and (b) receive circuit-switched communications from PSTN 112, convert those to packet-based communications, and pass them to another device within WSPN 105.

VPN terminator 130 may be any networking element arranged to carry out VPN-terminator functions. Thus, VPN terminator 130 may include a communication interface, a processor, and data storage containing instructions executable by the processor for carrying out VPN-terminator functions. The communication interface may include one or more wired and/or wireless interfaces for communicating with at least femtocell controller 132, PDSN 126, femtocell switch 136, MG 128, and WAN 106. In general, VPN terminator 130 functions to establish secure VPN connections over WAN 106 with femtocells such as femtocell 110, enabling the femtocells to securely communicate with devices on the WSPN 105, such as femtocell controller 132, and perhaps beyond.

Femtocell controller 132 may be any networking element arranged to carry out femtocell-controller functions. Thus, femtocell controller 132 may include a communication interface, a processor, and data storage containing instructions executable by the processor for carrying out femtocell-controller functions. The communication interface may include one or more wired and/or wireless interfaces for communicating with at least VPN terminator 130, along with perhaps one or more other entities on WSPN 105, and beyond.

Among other functions, femtocell controller 132 communicates via VPN terminator 130 with femtocells such as femtocell 110. Femtocell controller 132 may receive requests from various femtocells for access to a data store 134. Femtocell controller 132 may perform the requested functions via data store 134 and transmit replies to the requesting femtocell 110. Femtocell controller 132 may also be operable to select various operational parameters for femtocells (e.g., carrier, PN offset, whether to broadcast a pilot beacon, contents of any pilot beacon to be broadcast, transmission-power level, channel-list messages, candidate carriers for pilot-beacon broadcasts, number of slots per cycle), and to transmit those parameters to a femtocell, perhaps along with other configuration data and messaging.

Data store 134 may provide data storage facilities accessible by the femtocell controller 132 and/or femtocell 110. Although shown separately in FIG. 1, the data store 134 may otherwise be integrated with the femtocell controller 132. Alternatively, the data store 134 may be disposed outside the WSPN 105 and accessible via the WAN 106. When disposed outside the WSPN 105, additional access and control logic may be provided for retrieving data from data store 134 in accordance with access requests from femtocells 110.

The data store 134 may store and maintain, for example, one or more preference lists, blacklists, and/or whitelists for identifying WCDs authorized to utilize a femtocell such as femtocell 110. For example, the data store 134 may store a blacklist that contains identifiers of WCDs that are not authorized to receive service from one or more particular femtocells, or perhaps that are not authorized to receive service from any femtocell. Alternatively, or in addition, the data store 134 may store a whitelist that contains identifiers of WCDs that are authorized to receive service from one or more particular femtocells, or perhaps that are authorized to receive service from any and all femtocells (or perhaps all that are operated by a given service provider, among other options). Data store 134 may also maintain a priority list of WCDs that may at least partially determine a scheduling priority assigned to WCDs 101-104. The priority list may be entirely separate and distinct from any whitelist, or may be integrated with, and prioritize WCDs listed within, a whitelist.

The femtocell 110, when determining a scheduling priority for attached WCDs, may access the data store 134 and use information retrieved (such as from one or more preference lists, one or more blacklists, and/or one or more whitelists stored at the data store 134) in determining whether attached WCDs should be assigned any time slots within a TDMA cycle, and/or how many time slots within a cycle should be assigned to the attached WCDs, perhaps among one or more other determinations.

Femtocell switch 136 may be any networking element arranged to carry out femtocell-switch functions. As such, femtocell switch 136 may include a communication interface, a processor, and data storage containing instructions executable by the processor for carrying out femtocell-switch functions. The communication interface may include one or more wired and/or wireless interfaces for communicating with at least MSC 124 and VPN terminator 130. In general, femtocell switch 136 acts as a switch between MSC 124 and VPN terminator 130, enabling WCDs 101-104 communicating via femtocells 110 to engage in calls over PSTN 112 via MSC 124.

2. Examples of Operation

Figure 4:
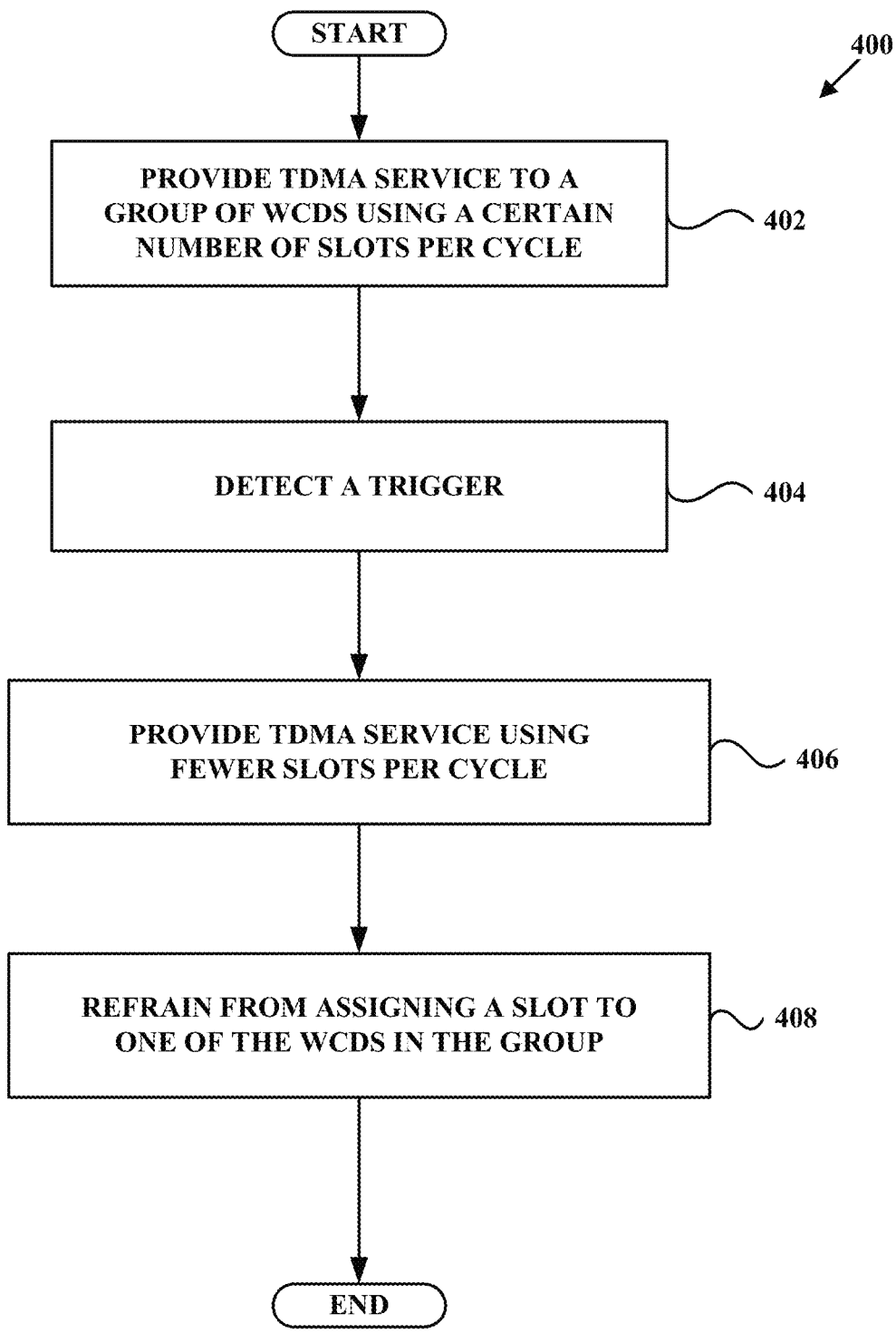
FIG. 4 is a flowchart of a method, in accordance with at least one embodiment.

FIG. 4 depicts a flowchart of a method that may be carried out, in accordance with at least one embodiment. In particular, FIG. 4 depicts a method 400 for a femtocell such as femtocell 110 to prioritize TDMA communications resources at the femtocell 110.

As shown in FIG. 4, the method 400 begins at step 402, when femtocell 110 provides TDMA wireless service on a first femtocell carrier to a group of WCDs using a certain number of slots per cycle. At step 404, femtocell 110 detects a trigger. At step 406, femtocell 110 provides TDMA wireless service on the first femtocell carrier using fewer slots per cycle. At step 408, femtocell 110 refrains from assigning a slot to one of the WCDs in the group. These steps are further described below.

i. Provide TDMA Wireless Service to a Group of WCDs Using a Certain Number of Slots Per Cycle At step 402, and for a first period of time, the femtocell 110 provides TDMA wireless service on a first femtocell carrier to a group of WCDs using a certain number of slots per cycle. The TDMA wireless service provided by the femtocell 110 refers to the forward link on which traffic and control signals flow from the femtocell 110 to the WCDs. The femtocell 110 also provides a reverse link using the same protocol (e.g., TDMA), or a different protocol (e.g., CDMA). This setup is consistent with the EV-DO standard, which specifies a TDMA-based forward link and a CDMA-based reverse link. However, the reverse link protocol may be based on another protocol.

Also during this first period of time, femtocell 110 may be transmitting a pilot that serves as a demodulation reference and handoff-level-measurement signal, among other purposes. The pilot may be provided, as defined by the EV-DO specification, on the forward link and interlaced in time slots among those used to transmit user traffic. The femtocell could provide a pilot in another manner as well. Control channels on the forward link may be interlaced among time slots as well, perhaps in the same manner as the pilot. The control channels may be used to send signaling messages from the femtocell 110 to the WCDs 101-104. These signaling messages may alert the WCDs 101-104 of new communication sessions, of a channel or time-slot assignment, and/or other parameters to be used in communicating with the femtocell 110.

In addition, and during this first period of time, the femtocell 110 may also be transmitting a pilot beacon on another carrier separate from the first femtocell carrier. The other carrier may be, for example, a macro-network carrier. The femtocell 110 broadcasts a pilot beacon on macro-network carriers in order to advertise femtocell 110 resources to WCDs operating on macro-network carriers within a communication range of the femtocell 110.

The pilot beacon may include messages and parameters for WCDs 101-104 to use in initially connecting with the femtocell 110, and/or perhaps to facilitate handoff from a respective macro-network carrier (from BTS 120) to the femtocell carrier, among other possibilities. The messages and parameters may have informed the WCDs 101-104, operating on respective macro-network carriers, of the femtocell carrier, and the WCDs 101-104 may have subsequently used this information to handoff service to the femtocell 110, including transmitting a registration request to the femtocell 110 on the femtocell carrier. Of course, any one of WCDs 101-104 may have detected the first femtocell carrier on its own and transmitted a registration request and device identifier to femtocell 110, perhaps after powering up within communication range of the femtocell 110. Other examples are possible as well.

In the registration request itself, or perhaps in a separate transmission, each of the WCDs 101-104 may provide to the femtocell 110 their respective identifier that uniquely identifies that WCD to the femtocell 110. As set forth above, the identifier may be, for example, a MIN or an ESN associated with the respective WCD. Of course, other identifiers could be used. For example, the WCD 101 may be programmed to transmit a user ID associated with a user as an identifier. And other implementations are certainly possible.

Once a WCD such as WCD 101 is registered with the femtocell 110, it may transmit a resource request (e.g., a data rate control (DRC) request) via the reverse link to femtocell 110. Femtocell 110 may store all accumulated requests until scheduling-prioritization logic reviews the accumulated requests and determines which WCDs will be assigned available slots in a next slot cycle.

Figure 5:
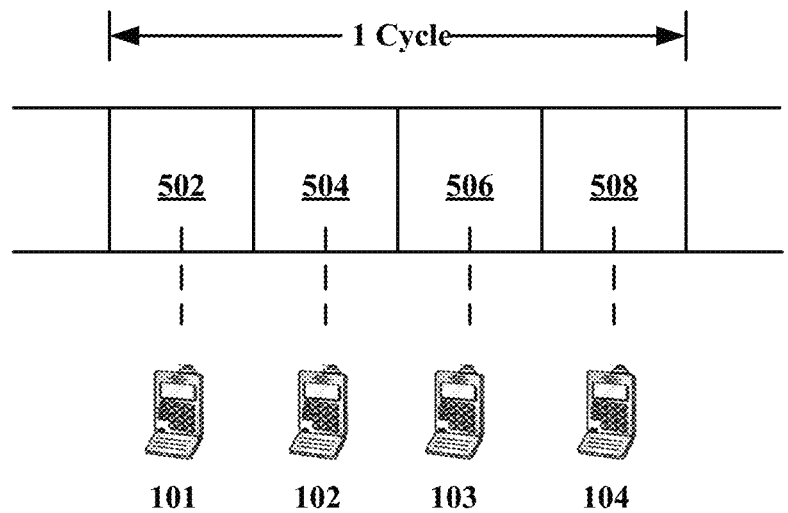
FIG. 5 is a timeslot diagram illustrating a slot cycle during a first period of time in accordance with at least one embodiment.

FIG. 5 illustrates an example of how scheduling-prioritization logic in femtocell 110 may schedule slots in a slot cycle. Scheduling-prioritization logic at femtocell 110 may be embodied by instructions stored in the program instructions 314 portion of data store 310 that, when executed by processor 308, cause the femtocell 110 to prioritize and assign slots in an upcoming slot cycle. WCDs 101-104 may be informed of their assigned slot in a signaling message sent via a control channel on the forward link. For the purpose of illustration, it is assumed in FIG. 5 that femtocell 110 has received resource requests from each of WCDs 101-104, and that the default (and current) number of slots per cycle at the femtocell 110 is set to four. The default number of slots per cycle at femtocell 110 may be defined by the femtocell 110 itself, by the wireless service provider network 105 (perhaps via femtocell controller 132), or by some other entity. While a default of four slots per cycle is set forth in this example, other values could alternatively be used.

Because the number of available slots per cycle is equal to the number of WCDs 101-104 requesting resources in the example of FIG. 5, scheduling-prioritization logic in femtocell 110 assigns one of the respective slots 502, 504, 506, and 508 in the next occurring cycle to each respective WCD 101, 102, 103, and 104. The scheduling-prioritization logic in femtocell 110 may implement any number of different scheduling algorithms and/or prioritization algorithms in scheduling slots.

For example, a simple round-robin scheduling algorithm assigns time slots in equal portions to all WCDs with no regard for past or present resource consumption. A proportional-fairness algorithm, on the other hand, takes into consideration a current achievable data rate of a WCD relative to the WCD's historical average data rate and distributes time slots in a subsequent cycle so as to more "fairly" distribute resources. The proportional-fairness algorithm assigns a priority value "P" to each WCD according to the ratio $P=T^{\alpha}/R^{\beta}$, where T denotes the data rate potentially achievable for the WCD in a next time slot, R the historical average data rate for the WCD, and where $\alpha$ and $\beta$ tune the fairness of the scheduler. For example, in the extreme case where $\alpha=0$ and $\beta=1$, the scheduler acts in a round-robin fashion and serves all mobiles equally often, with no regard for resource consumption. In the opposite extreme of $\alpha=1$ and $\beta=0$, the scheduler will always serve the mobile with the best channel conditions first. In between these extremes, values of $\alpha$ and $\beta$ can be tweaked to emphasize equal treatment or more capable WCDs.

For the purpose of illustration, it is assumed in FIG. 5 that each of WCDs 101-104 has a similar calculated scheduling priority, and that each of the WCDs 101-104 is assigned one slot in the next cycle. However, in other examples, a priority assigned to a first one of WCDs 101-104 may be sufficiently higher than a priority assigned to a second one of WCDs 101-104 that a particular scheduling algorithm assigns a slot in a next occurring cycle to the first WCD at the expense of a slot assigned to the second WCD. In most algorithms, including the proportional-fairness algorithm, a WCD that is not assigned a slot in one cycle in this situation will usually be assigned a slot in the next cycle.

ii. Detect a Trigger

At step 404, the femtocell 110 detects a trigger, perhaps due to a triggering event at the femtocell, in the WSPN 105, or at some other device communicatively coupled to femtocell 110. Detecting the trigger may include the femtocell 110 detecting that one or more of the attached WCDs 101-104 are less-preferred WCDs, which itself may mean that they are "foreign" (in the sense of not being "home") WCDs that have not been authorized to use the femtocell 110 by, e.g., an owner of the femtocell 110 or perhaps an operator of the WSPN 105 with which the femtocell 110 is associated.

Detecting the trigger may involve detecting other types of events, conditions, etc., instead or in addition to the foregoing. For example, a trigger may be based on a time of day, a day of the week, and/or some other chronological determination. For example, during business hours, WCDs 101-103 associated with business users at femtocell 110 may be preferred over WCD 104 associated with a personal user. During non-business hours, the preference may be reversed. And certainly many other examples are possible as well.

The trigger may additionally or alternatively be based upon a number of active users being served by the femtocell 110. For example, a trigger may be detected when the number of active users that are currently being served by the femtocell 110 rises above three. Of course, other numbers may also be used, and the number may change based on time of day, day of week, or some other chronological determination.

In at least one embodiment, the trigger may be based on at least one capacity metric relating to femtocell 110, such as remaining available capacity (e.g. channel elements, number of slots per cycle available), percentage or fractional capacity, etc. For example, a trigger may be detected when all slots in a cycle are assigned to active WCDs. Alternatively, a trigger may not be detected until an active WCD is denied a slot in a subsequent cycle due to a lack of available slots. Other variations are possible as well.

In the case of the trigger being based on some identification of the attached WCDs 101-104 as less-preferred WCDs (or more-preferred, in other cases), the femtocell 110 may make a determination that the one or more attached WCDs 101-104 are less-preferred at least in part by referencing a list of identifiers associated with the WCDs 101-104. The femtocell 110 may use the identifiers provided by respective WCDs 101-104, or some other identifier associated with the WCDs 101-104, to make the preference determination. The list of identifiers may be stored locally at the femtocell 110, or remotely from the femtocell 110.

If stored at the femtocell 110, the list may be stored in a local volatile or non-volatile memory of the femtocell 110, including for example, the femtocell data storage element 310. Alternatively, the list may be stored remotely at a device within the WSPN 105 and accessible by the femtocell 110 via the WAN 106. The list itself may be created and/or maintained by an owner or lessee of the femtocell 110, or may be created and/or maintained by the WSPN 105. In an embodiment, the femtocell 110 may be provided with a local interface in which a registered owner may populate the list with identifiers associated with WCDs and their desired attributes.

In the event that the list is stored remote from the femtocell 110 (e.g., at the WSPN 105), the list may be populated by the WSPN 105, or perhaps the wireless service provider may provide an interface to allow the registered owner of the femtocell 110 to access and populate the list. The femtocell 110 may obtain access to the remote list by, for example, transmitting a session initiation protocol (SIP) message to the WSPN 105. Alternatively, the femtocell 110 may retrieve the remotely-stored list via a file transfer connection. The file transfer connection may be based on the file transfer protocol (FTP), the Hypertext Transfer Protocol (HTTP), or any other known or later-developed file transfer protocol. Other possibilities exist as well.

In one embodiment, the list may be a preference list, which the femtocell 110 may access and determine, based on WCD identifiers, whether respective WCDs are more-preferred or less-preferred.

TABLE 1

| Example Preference List Structure | |
|---|---|
| Rule | Device ID's |
| More-Preferred | 101: 3125551212 |
| Less-Preferred | 104: E8123DDA |

Table 1 illustrates one example data structure for the preference list. While Table 1 shows two WCDs and two rules, the disclosed method and apparatus is equally applicable to any other number of WCDs, and to any other number of rules. Furthermore, while the WCD reference characters in Table 1 have been chosen to correspond to the reference characters in FIG. 1 for ease of reference, it should be understood that any combination of alphanumeric characters could be used as a WCD device ID.

The data shown in Table 1 may have been previously set by a user associated with the femtocell 110, or may have been set by the wireless service provider, or perhaps some combination of the two. In at least one embodiment, more-preferred WCDs may be, for example, associated with business users while less-preferred WCDs may be associated with non-commercial users. In at least one embodiment, more-preferred WCDs may be associated with a mother and father in a household, while the less-preferred WCDs may be associated with children in the household. Other examples are possible as well.

As shown in Table 1, WCD 101 has a mobile identification number (MIN) of 3125551212 acting as a device identifier. WCD 104 has an electronic serial number (ESN) of E8123DDA acting as a device identifier. While Table 1 utilizes varying device-identifier types (ESN and MIN), a single device-identifier type may be used throughout the list. Furthermore, while Table 1 utilizes a binary designation of "More-Preferred" and "Less-Preferred," numerical (and more than two) priority designations could be used. For example, on a scale of 1-10, WCD 101 could be assigned a priority of 9, while WCD 104 is assigned a priority of 2. WCDs not listed in the preference-list structure, such as priorities of WCDs 102 and 103, could be assigned a default priority of 5. Other designators could also be used.

In an alternative embodiment, the list may comprise a whitelist and/or a blacklist of WCDs that identify, respectively, WCDs that are authorized to use femtocell 110 and WCDs that are not authorized to use femtocell 110. WCDs present in a whitelist may be deemed by the femtocell 110 to be "more-preferred" than WCDs not in the whitelist, and WCDs present in a blacklist may deemed to be "less-preferred" than WCDs not in the blacklist.

TABLE 2

Example Whitelist Structure
White-listed Device ID's

101: 3125551212
102: F1566AAC
103: 3125551111

Table 2 illustrates one example whitelist data structure. While Table 2 shows three WCDs, the disclosed method and apparatus is equally applicable to any number. Furthermore, while the WCD reference characters in Table 2 have been chosen to correspond to the reference characters in FIG. 1 for ease of reference, it should be understood that any combination of alphanumeric characters could be used as a WCD device ID.

Similar to the preference-list structure, the data shown in Table 2 may have been previously set by a user associated with the femtocell 110, or may have been set by the WSPN 105, or some combination thereof. The WCDs listed in the whitelist, including WCDs 101-103, may be WCDs associated with an owner of the femtocell 110. Therefore, WCDs 101-103 may be preferred over non-white-listed WCDs. At the same time, if femtocell 110 is not being used by any white-listed WCDs, or there is some excess capacity available at femtocell 110, it may be preferable to the WSPN 105 to allow general users to use the resources at the femtocell 110 in order to reduce a strain on the macro network, and/or for some other reason.

As shown in Table 2, WCD 102 has an ESN of F1566AAC acting as a device identifier. WCD 103 has an MIN of 312555111 acting as a device identifier. While Table 2 utilizes varying device identifier types (ESN and MIN), a single device-identifier type may be used throughout the list in order to provide consistency. A corresponding example blacklist structure may comprise, for example, a single Device ID for WCD 104.

Scheduling-prioritization logic in femtocell 110 may use information retrieved from the whitelist structure of Table 2, in which WCDs 101-103 are listed, in order to prefer WCDs 101-103 relative to WCD 104 in scheduling slots in a next cycle. In the example set forth in FIG. 5, however, because there are a sufficient number of timeslots to serve all of WCDs 101-104, the information retrieved from the whitelist of Table 2 would not impact the service provided by the femtocell 110 to WCDs 101-104. Although the whitelist and preference-list structures are described separately above, in another embodiment they may be combined into a single list which ranks white-listed WCDs relative to one another.

Information sourced from either of the preference-list structure or the whitelist data structure may be used by the femtocell 110 in detecting a trigger in step 404. For example, the registration of either more-preferred WCD 101 or less-preferred WCD 104 at femtocell 110 may be considered a triggering event at femtocell 110. Similarly, the registration of one of the white-listed WCDs 101-103 (or, in an alternative embodiment, the black-listed WCD 104) may be considered a triggering event at femtocell 110.

iii. Provide TDMA Service Using Fewer Slots Per Cycle

Figure 6:
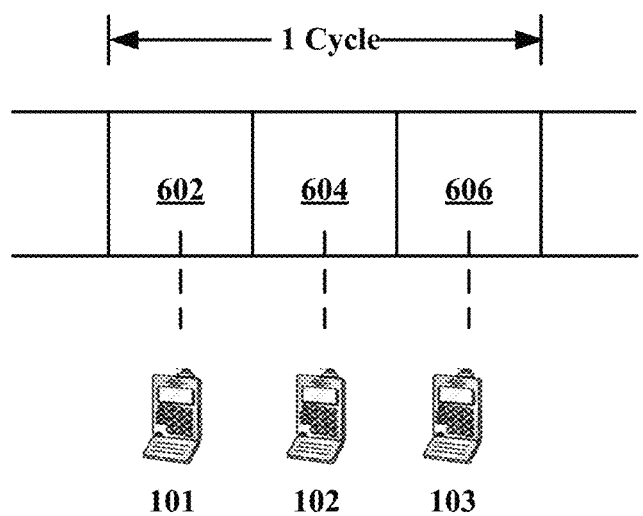
FIG. 6 is a timeslot diagram illustrating a slot cycle during a second period of time in accordance with at least one embodiment.

At step 406, responsive to detecting the trigger in step 404, femtocell 110 begins, in a second period of time, to provide TDMA service using fewer slots per cycle. As shown in FIGS. 5 and 6, femtocell 110 may reduce the number of slots per cycle from four (slots 502, 504, 506, and 508 in FIG. 5) to three (slots 602, 604, and 606 in FIG. 6). As a result of this reduction, and assuming that all four WCDs 101-104 continue to be active and request resources from femtocell 110, at least one of the WCDs 101-104 will not be assigned a slot in the reduced three-slot cycle of FIG. 6 during at least the second period of time. The reduction of slots per cycle from four to three is of course only one example, and certainly other slot-cycle reductions could be used. For example, femtocell 110 may initially provide TDMA service using six slots per cycle for the first time period and, responsive to detecting a trigger during the first time period, switch to providing TDMA service using four slots per cycle for the second time period. Other combinations are possible as well.

The first time period may be any time period up until the point in time that the trigger is detected, and may comprise (i) a time period during which a determination of whether or not to reduce a number of time slots per cycle is made, and (ii) a time period until the start of a cycle in which the number of slots per cycle is actually reduced. The second period of time may comprise a fixed time period set by the femtocell 110 and/or the WSPN 105 such as 600 second or 100 cycles. In some embodiments, the second period of time may extend until a second trigger is detected by the femtocell 110.

The femtocell 110 detecting the second trigger may comprise the femtocell detecting that a slot in the reduced number of slots per cycle has become available. This may occur, for example, when one or more, or all, of the active WCDs 101-103 in FIG. 6 becomes inactive, leaves the service area of femtocell 110, or otherwise is no longer requesting resources from femtocell 110 (or perhaps is requesting resources at a lower data rate than before), among many other possibilities.

In at least one embodiment, the second trigger may comprise an expiration of a chronological condition related to the first trigger, such as the expiration of "business hours" at the femtocell 110. The second trigger may be based on a detected modification to the preference-list structure and/or the whitelist structure. Other possibilities exist as well.

iv. Refrain from Assigning a Slot to One of the WCDs in the Group

At step 408, and during the second period of time, femtocell 110 refrains from assigning one of the reduced number of slots 602, 604, 606 to at least one of the active WCDs 101-104. Because the femtocell 110 assigns slots on a cycle-by-cycle basis (e.g., slots in a subsequent cycle are not assigned until after the current cycle), steps may be taken at the start of each cycle to prevent at least one of the WCDs in the group from being assigned a slot.

The identification of the at least one WCD in the group that will not be assigned a slot may be related to the triggering event. For example, the identification of WCD 104 as a less-preferred WCD may cause the triggering event and, at the same time, cause femtocell 110 to prevent WCD 104 from being assigned a slot in the next cycle. Similarly, the identification of WCDs 101-103 as existing on a whitelist may cause the triggering event and, at the same time, cause femtocell 110 to artificially prevent WCD 104 (that does not appear on the whitelist) from being assigned a slot in the next cycle.

Assuming for the purposes of this example that the preference-list structure of Table 1 is maintained at femtocell 110, and responsive to detecting the trigger, scheduling-prioritization logic at femtocell 110 identifies WCD 101 as a more-preferred WCD and WCD 104 as a less-preferred WCD, and increases the odds that WCD 101 is assigned a slot in the three-slot cycle of FIG. 6 and/or reduces the odds that WCD 104 is assigned a slot in the cycle. If the scheduling-prioritization logic at femtocell 110 implements a round-robin scheduling algorithm, this may involve simply assigning a slot to WCD 101 in each round-robin slot-assignment process and refraining from assigning a slot to WCD 104 in each round-robin slot-assignment process. If the scheduling-prioritization logic at femtocell 110 alternatively implements a proportional-fairness algorithm, this may involve increasing a calculated P value for WCD 101 so that WCD 101 most often has a highest P value and decreasing a calculated P value for WCD 104 so that WCD 104 most often has a lowest P value. In one embodiment, this may involve ensuring that WCD 101 always has the highest P value and/or ensuring that WCD 104 always has the lowest P value. In any event, scheduling-prioritization logic at femtocell 110 causes femtocell resources to be reserved for the more-preferred WCDs at the expense of the less-preferred WCDs.

In an example in which the whitelist structure of Table 2 is maintained at femtocell 110, scheduling-prioritization logic at femtocell 110 may, responsive to detecting the trigger, identify WCD 104 as a non-white-listed WCD, and reduce the odds of and/or prevent the WCD 104 from being assigned a slot in the three-slot cycle of FIG. 6. If the scheduling logic at femtocell 110 implements a round-robin scheduling technique, this may involve simply skipping WCD 104 in the round-robin slot-assignment process.

In one embodiment, this may further involve skipping WCD 104 in every round-robin slot-assignment process for the second period of time, or perhaps only assigning a slot to WCD 104 in every $10^{th}$ or every $100^{th}$ cycle, as examples. If the femtocell 110 implements a proportional-fairness algorithm, this may involve lowering a calculated P value for WCD 104 so that it is most often below the calculated P values for white-listed WCDs 101-103. In one embodiment, this may further involve setting the P value for WCD 104 to its lowest possible value in order to ensure that no slot is ever assigned to WCD 104 during the second period of time. In any event, scheduling-prioritization logic at femtocell 110 causes femtocell resources to be reserved for the more-preferred WCDs at the expense of the less-preferred WCDs.

As a result of reducing the number of slots per cycle, and scheduling the "more-preferred" and or "white-listed" WCDs more often, femtocell 110 may reduce a TDMA wireless service level provided to one or more of a plurality of attached WCDs in order to preserve communications resources for the remaining attached WCDs in the plurality, for at least a second period of time. As noted earlier, the second period of time may extend for a predetermined amount of time (such as 600 seconds, or 100 cycles, as examples), or may extend until a second trigger is detected at femtocell 110.

During a third time period after the second time period, the femtocell 110 may return to providing service on a greater number of slots per cycle than during the second time period, and no longer disadvantage one or more of the active WCDs 101-104. For example, during the third time period, the femtocell 110 may return to providing four slots per cycle as in FIG. 5, and may then subsequently assign a time slot to the WCD 104 (where the WCD 104 was not assigned a time slot in the second period of time, as illustrated in FIG. 6). Of course, if resources are freed up due to actions related to one or more of the active WCDs 101-103, femtocell 110 may keep the number of slots per cycle at three, but begin providing slots to WCD 104. And certainly many other examples are possible.

3. Conclusion

In accordance with the foregoing embodiments, a femtocell may reduce a TDMA wireless service level provided to one or more of a plurality of attached WCDs in order to preserve communications resources for the remaining attached WCDs in the plurality. As a result, the femtocell may prevent unauthorized or less-preferred WCDs from using resources that may then be allocated to more-preferred or authorized WCDs including, but not limited to, the registered owner (or owners) of the femtocell. And certainly other advantages are achieved as well.

Various example embodiments have been described above. Those skilled in the art will understand, however, that changes and modifications may be made to those examples without departing from the scope of the claims.

The invention claimed is:

1. A method of a femtocell providing time-division-multiplexed wireless service to wireless communication devices (WCDs) during a time period divided into contiguous cycles, wherein each cycle is divided into contiguous slots, the method comprising:
   during a first cycle, the femtocell (i) receiving, from each of a plurality of WCDs, at least one respective request to use a resource and (ii) assigning each of the plurality of WCDs to a respective slot of the first cycle;
   the femtocell providing service to each of the plurality of WCDs during the respective assigned slot of the first cycle;
   the femtocell detecting a trigger, wherein detecting the trigger comprises detecting that a first WCD in the plurality is less-preferred than every other WCD in the plurality, wherein detecting that the first WCD is less-preferred than every other WCD in the plurality comprises (i) checking for the presence of an identifier associated with the first WCD in a whitelist of WCDs maintained by the femtocell, and (ii) determining that the identifier associated with the first WCD is not present in the whitelist;
   responsive to the femtocell detecting the trigger, the femtocell (i) identifying at least one WCD in the plurality, and (ii) assigning each of the plurality of WCDs, except for the identified at least one WCD, to a respective slot of a second cycle that is subsequent to the first cycle;
   during the second cycle, the femtocell receiving, from each of the plurality of WCDs, at least one respective request to use a resource; and
   the femtocell providing service to each of the plurality of WCDs, except for the identified at least one WCD, during the respective assigned slot of the second cycle.

2. The method of claim 1, wherein detecting that the first WCD is less-preferred than every other WCD in the plurality comprises (i) transmitting a request to a whitelist database external to the femtocell and (ii) examining a content of an authorization reply received by the femtocell from the whitelist database, the authorization reply being associated with the authorization request.

3. The method of claim 1, wherein identifying the at least one WCD in the plurality comprises identifying in the plurality the WCD that has a lowest scheduling-priority.

4. The method of claim 1, further comprising the femtocell applying scheduling prioritization logic that is based at least in part on past data-transfer rates respectively associated with each WCD in the plurality to determine relative scheduling priorities for each such WCD, and decreasing the resultant scheduling priority of the first WCD in the plurality relative to every other WCD in the plurality.

5. The method of claim 1, further comprising the femtocell detecting a second trigger; and responsive to detecting the second trigger, assigning each of the plurality of WCDs to a respective slot of a third cycle that is subsequent to the second cycle.

6. The method of claim 5, wherein detecting the second trigger comprises detecting that every WCD in the plurality, except for the identified at least one WCD is no longer assigned a slot in the second cycle.

7. The method of claim 6, wherein detecting the second trigger comprises detecting that at least one WCD in the plurality other than the identified at least one WCD is no longer assigned a slot in the second cycle.

8. The method of claim 1, wherein the time period is divided into contiguous cycles of equal duration.

9. The method of claim 1, wherein each cycle is divided into contiguous slots of equal duration.

10. A method of a femtocell providing time-division-multiplexed wireless service to wireless communication devices (WCDs) during a time period divided into contiguous cycles, wherein each cycle is divided into contiguous slots, the method comprising:

during a first cycle, the femtocell (i) receiving, from each of a plurality of WCDs, at least one respective request to use a resource and (ii) assigning each of the plurality of WCDs to a respective slot of the first cycle;

the femtocell providing service to each of the plurality of WCDs during the respective assigned slot of the first cycle;

the femtocell detecting a trigger, wherein detecting the trigger comprises detecting that a first WCD in the plurality, different from a second WCD in the plurality, is more-preferred than the second WCD;

responsive to the femtocell detecting the trigger, the femtocell (i) increasing a scheduling priority assigned to the first WCD above a scheduling priority assigned to the second WCD, (ii) identifying at least one WCD in the plurality, wherein identifying the at least one WCD in the plurality comprises identifying in the plurality the at least one WCD that has a lowest scheduling-priority, and (iii) assigning each of the plurality of WCDs, except for the identified at least one WCD, to a respective slot of a second cycle that is subsequent to the first cycle;

during the second cycle, the femtocell receiving, from each of the plurality of WCDs, at least one respective request to use a resource; and the femtocell providing service to each of the plurality of WCDs, except for the identified at least one WCD, during the respective assigned slot of the second cycle.

11. The method of claim 10, further comprising the femtocell detecting a second trigger; and responsive to detecting the second trigger, assigning each of the plurality of WCDs to a respective slot of a third cycle that is subsequent to the second cycle.

12. The method of claim 10, wherein detecting the second trigger comprises detecting that every WCD in the plurality, except for the identified at least one WCD is no longer assigned a slot in the second cycle.

13. The method of claim 10, wherein detecting the second trigger comprises detecting that at least one WCD in the plurality other than the identified at least one WCD is no longer assigned a slot in the second cycle.

14. The method of claim 10, wherein the time period is divided into contiguous cycles of equal duration.

15. The method of claim 10, wherein each cycle is divided into contiguous slots of equal duration.

* * * * *